(12) United States Patent
Rebrovick et al.

(10) Patent No.: US 10,825,033 B2
(45) Date of Patent: Nov. 3, 2020

(54) SYSTEMS AND METHODS FOR USING A GRAPHICAL USER INTERFACE TO PREDICT MARKET SUCCESS

(71) Applicant: Consensus Point, Inc., Nashville, TN (US)

(72) Inventors: Linda Rebrovick, Nashville, TN (US); Brian Hogue, Nashville, TN (US); Brad Wilson, Nashville, TN (US); Jason Vowell, Nashville, TN (US)

(73) Assignee: CONSENSUS POINT, INC., Nashville, TN (US)

( * ) Notice: Subject to any disclaimer, the term of this patent is extended or adjusted under 35 U.S.C. 154(b) by 966 days.

(21) Appl. No.: 15/218,718

(22) Filed: Jul. 25, 2016

(65) Prior Publication Data

US 2016/0335647 A1     Nov. 17, 2016

Related U.S. Application Data

(63) Continuation-in-part of application No. 14/142,327, filed on Dec. 27, 2013, now abandoned.

(60) Provisional application No. 61/746,825, filed on Dec. 28, 2012.

(51) Int. Cl.
*G06Q 30/02* (2012.01)
*G06F 3/0484* (2013.01)
*G06F 3/0482* (2013.01)
*H04L 29/06* (2006.01)

(52) U.S. Cl.
CPC ....... *G06Q 30/0203* (2013.01); *G06F 3/0482* (2013.01); *G06F 3/04847* (2013.01); *H04L 67/42* (2013.01)

(58) Field of Classification Search
None
See application file for complete search history.

(56) References Cited

U.S. PATENT DOCUMENTS

| 4,603,232 | A | 7/1986 | Kurland et al. |
| 5,124,911 | A | 6/1992 | Sack |
| 5,740,035 | A | 4/1998 | Cohen et al. |
| 5,970,467 | A | 10/1999 | Alavi |
| 5,999,918 | A | 12/1999 | Williams et al. |

(Continued)

FOREIGN PATENT DOCUMENTS

WO     0186532 A1     11/2001

OTHER PUBLICATIONS

"Prediction Markets as a Forecasting Tool" (written by Daniel E. O'Leary and published in 2011 in vol. 8, 169-184 of Advances in Business and Management Forecasting) (Year: 2011).*

(Continued)

*Primary Examiner* — James M Detweiler
(74) *Attorney, Agent, or Firm* — NEO IP

(57) ABSTRACT

Systems and methods having a graphic user interface for market research surveys are provided that allow users to participate in a combined prediction market and market research environment virtually without being presented directly with a stock market environment. The systems and methods of the present invention use prediction markets to automatically transform the user-provided inputs and/or selections from market research surveys, and automatically generate data that represents the likelihood of success of a product and/or service in the marketplace or commercial markets.

17 Claims, 9 Drawing Sheets

Responding to a Question

(56) References Cited

U.S. PATENT DOCUMENTS

| | | | |
|---|---|---|---|
| 6,012,051 A | 1/2000 | Sammon et al. | |
| 6,093,026 A | 7/2000 | Walker et al. | |
| 6,233,564 B1 | 5/2001 | Schulze | |
| 6,260,019 B1 | 7/2001 | Courts | |
| 6,321,179 B1 | 11/2001 | Glance et al. | |
| 6,405,180 B2 | 6/2002 | Tilfors et al. | |
| 6,684,190 B1 | 1/2004 | Powers et al. | |
| 6,826,541 B1 | 11/2004 | Johnston et al. | |
| 6,865,578 B2 | 3/2005 | Hays | |
| 6,993,495 B2 | 1/2006 | Smith et al. | |
| 6,999,987 B1 | 2/2006 | Billingsley et al. | |
| 7,120,928 B2 | 10/2006 | Sheth et al. | |
| 7,191,143 B2 | 3/2007 | Keli et al. | |
| 7,299,204 B2 | 11/2007 | Peng et al. | |
| 7,308,418 B2 | 12/2007 | Malek et al. | |
| 7,337,135 B1 | 2/2008 | Findlay et al. | |
| 7,356,498 B2 | 4/2008 | Kaminsky et al. | |
| 7,386,499 B2 | 6/2008 | Kocher | |
| 7,398,223 B2 | 7/2008 | Kahlert et al. | |
| 7,451,213 B2 | 11/2008 | Kaplan | |
| 7,509,278 B2 | 3/2009 | Jones | |
| 7,546,543 B2 | 6/2009 | Louch et al. | |
| 7,664,670 B1 | 2/2010 | Weiss | |
| 7,693,808 B2 | 4/2010 | Tingling | |
| 7,765,491 B1 | 7/2010 | Cotterill | |
| 7,827,203 B2 | 11/2010 | Keil et al. | |
| 7,835,972 B2 | 11/2010 | Almeida et al. | |
| 7,873,535 B2 | 1/2011 | Umblijs et al. | |
| 7,904,331 B2 | 3/2011 | Keil et al. | |
| 7,908,166 B2 | 3/2011 | Keil et al. | |
| 7,921,031 B2 | 4/2011 | Crysel et al. | |
| 7,958,006 B2 | 6/2011 | Keil et al. | |
| 7,970,722 B1 | 6/2011 | Owen et al. | |
| 7,987,130 B2 | 7/2011 | Waldron et al. | |
| RE42,869 E | 10/2011 | Boe et al. | |
| 8,086,481 B2 | 12/2011 | Smith | |
| 8,090,614 B2 | 1/2012 | Ford et al. | |
| 8,121,891 B2 | 2/2012 | Handel et al. | |
| 8,285,632 B2 | 10/2012 | Heyman et al. | |
| 8,290,810 B2 | 10/2012 | Ramer et al. | |
| 8,306,849 B2 | 11/2012 | Graham et al. | |
| 8,321,417 B2 | 11/2012 | Davids | |
| 8,380,595 B1 | 2/2013 | Fogarty | |
| 8,396,777 B1* | 3/2013 | Fine | G06Q 30/0202 705/35 |
| 8,448,204 B2 | 5/2013 | Johnson et al. | |
| 8,533,846 B2 | 9/2013 | Rivera | |
| 8,540,514 B2 | 9/2013 | Gosling | |
| 8,560,966 B2 | 10/2013 | Cotterill | |
| 8,583,470 B1 | 11/2013 | Fine et al. | |
| 9,679,568 B1* | 6/2017 | Taubman | G10L 15/22 |
| 2002/0013760 A1 | 1/2002 | Arora et al. | |
| 2002/0026390 A1 | 2/2002 | Ulenas et al. | |
| 2002/0049628 A1 | 4/2002 | West et al. | |
| 2002/0152110 A1 | 10/2002 | Stewart et al. | |
| 2002/0184041 A1 | 12/2002 | Muller | |
| 2003/0004858 A1 | 1/2003 | Schmitz et al. | |
| 2003/0046140 A1 | 3/2003 | Callahan et al. | |
| 2003/0050928 A1 | 3/2003 | Hays | |
| 2003/0105773 A1 | 6/2003 | Linde et al. | |
| 2003/0126010 A1 | 7/2003 | Barns-Slavin | |
| 2003/0135445 A1 | 7/2003 | Herz et al. | |
| 2003/0172019 A1 | 9/2003 | Getty | |
| 2004/0019554 A1 | 1/2004 | Merold et al. | |
| 2004/0064357 A1 | 4/2004 | Hunter et al. | |
| 2004/0064394 A1 | 4/2004 | Wallman | |
| 2005/0101381 A1 | 5/2005 | Hattori | |
| 2006/0069635 A1 | 3/2006 | Ram et al. | |
| 2006/0106743 A1 | 5/2006 | Horvitz | |
| 2006/0235786 A1 | 10/2006 | DiSalvo | |
| 2006/0282369 A1 | 12/2006 | White | |
| 2007/0073606 A1 | 3/2007 | Lai | |
| 2007/0112662 A1 | 5/2007 | Kumar | |
| 2007/0130040 A1 | 6/2007 | Stinski | |
| 2007/0250429 A1 | 10/2007 | Walser et al. | |
| 2007/0265954 A1 | 11/2007 | Mather et al. | |
| 2008/0033773 A1 | 2/2008 | Brazell | |
| 2008/0195459 A1 | 8/2008 | Stinski | |
| 2008/0270317 A1 | 10/2008 | Waldron et al. | |
| 2008/0288326 A1 | 11/2008 | Abramowicz | |
| 2008/0294498 A1 | 11/2008 | Adrien et al. | |
| 2008/0319825 A1 | 12/2008 | Lacomb et al. | |
| 2009/0043623 A1 | 2/2009 | Blades et al. | |
| 2009/0063359 A1 | 3/2009 | Connors | |
| 2009/0076939 A1 | 3/2009 | Berg et al. | |
| 2009/0076974 A1 | 3/2009 | Berg et al. | |
| 2009/0089198 A1 | 4/2009 | Kroutik | |
| 2009/0106084 A1 | 4/2009 | Or | |
| 2009/0177553 A1 | 7/2009 | Short et al. | |
| 2009/0182624 A1 | 7/2009 | Koen et al. | |
| 2009/0254475 A1 | 10/2009 | Pennock et al. | |
| 2009/0259597 A1 | 10/2009 | Wallman | |
| 2009/0307147 A1 | 12/2009 | Ruggie | |
| 2009/0327163 A1 | 12/2009 | Swan et al. | |
| 2010/0004987 A1 | 1/2010 | Benschop | |
| 2010/0125520 A1* | 5/2010 | Heyman | G06Q 40/04 705/37 |
| 2010/0145773 A1 | 6/2010 | Desai et al. | |
| 2010/0185564 A1 | 7/2010 | King et al. | |
| 2010/0217685 A1 | 8/2010 | Melcher et al. | |
| 2010/0250391 A1 | 9/2010 | Yruski et al. | |
| 2010/0324971 A1 | 12/2010 | Morsberger | |
| 2011/0087583 A1 | 4/2011 | Shrem | |
| 2011/0173018 A1 | 7/2011 | Hoffner et al. | |
| 2011/0251954 A1 | 10/2011 | Chin | |
| 2012/0101933 A1* | 4/2012 | Hanson | G06F 3/04847 705/37 |
| 2012/0166252 A1 | 6/2012 | Walker | |
| 2013/0035981 A1 | 2/2013 | Brown et al. | |
| 2013/0304567 A1 | 11/2013 | Adrien et al. | |
| 2015/0317589 A1 | 11/2015 | Anderson et al. | |
| 2016/0092989 A1 | 3/2016 | Marsh | |

OTHER PUBLICATIONS

Middlemiss, J. (2002). Users have favorites for direct-access technology (end users in action). Wall Street & Technology, 20(2),S16(3). Retrieved from http://dialog.proquest.com/professional/docview/678123181 ?accountid=142257 on Jul. 7, 2016.

Stearns, F. R. (1004). Trading system and method having a configurable market depth tool with dynamic price axis Retrievedfrom http://dialog.proquest.com/professional/docview/743633641 ?accountid=142257 on Jul. 7, 2016.

Almenberg, J., Kittlitz, K., & Pfeiffer, T. (2009). An experiment on prediction markets in science. PLOS ONE, 4(12) doi: http://dx.doi.org/10.1371 /journal.pone.0008500 on Mar. 7, 2019 (Year: 2009).

ATD financial services receives approval to expand market making operations; automated market maker now making markets in allNMS names. (Feb. 2, 2006). Business Wire Retrieved from https://dialog.proquest.com/professional/docview/675995142?accountid=142257 on May 11, 2019 (Year: 2006).

Othman, A., Sandholm, T., Pennock, D. M., & Reeves, D. M. (2010). A practical liquidity-sensitive automated market maker doi:http://dx.doi .org/10.1145/1807342.1807 402 on May 11, 2019 (Year: 2010).

Pennock, D. M., & Sarni, R. (2007). Computational aspects of prediction markets. Algorithmic game theory (pp. 651-676)Cambridge University Press. doi:http://dx.doi.org/10.1017/CB09780511800481.028 Retrieved from https://dialog.proquest.com/professional/docview/1915157609?accountid=142257 on May 11, 19 (Year: 2007).

Schack, J. (2000). Showdown over market structure. Institutional Investor, 34(4), 63. Retrieved from https://dialog.proguest.com/professional/docview/671073149?accountid=142257 on May 11, 2019 (Year: 2000).

Berg, Henry, Prediction Markets at Microsoft. Microsoft, Nov. 1, 2007.

CensusPoint.com Web Pages, Census Point, Inc., Jan. 11, 2007, Retrieved from Archive.org Nov. 23, 2015.

(56) References Cited

OTHER PUBLICATIONS

Consensus Point Market Profiled in Business 2.0. ConsensusPoint. com, Sep. 13, 2006.
Davidson, James Cameron, Forecasting Motion Picture Box-Office Returns and Analysis of the Hollywood Stock Exchange. Princeton University, Apr. 17, 2006.
Huunu Engaging Wisdome—Product Brochure. Consensus Point, Date Unknown.
Pennock, David M., et al., The Power of Play: Efficiency and Forecast Accuracy in Web Market Games. NEC Research Institute Technical Report, Feb. 17, 2001.

* cited by examiner

FIGURE 2

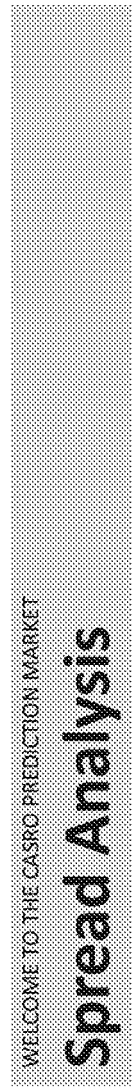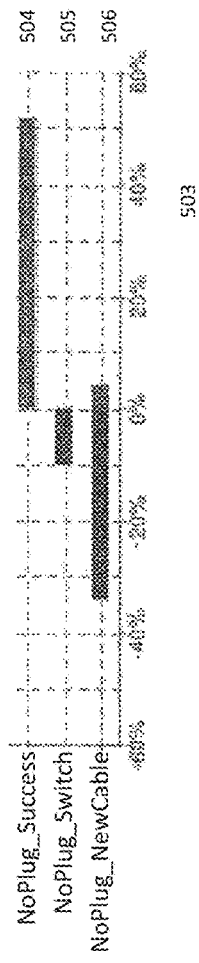
Figure 5

Tracking My Answers and Performance  Figure 8

My Answers

Below are the amount of points you currently have invested in each question. Feel free to adjust the points in any or reclaim all your points from the question.

| TITLE (SYMBOL) | POSITION | VALUE (PROFIT) | | |
|---|---|---|---|---|
| Will NoPlug be successful in the marketplace? (NoPlug_Success) | Yes | 1,500 (0) | Answer | Claim Points |
| Will people that already have televisions installed switch to NoPlug? (NoPlug_Televisions) | No | 1,000 (-0) | Answer | Claim Points |

Holdings: 2,500
Points: 12,201
Networth: 14,701

- Networth: 14,701
- My Rank: 2
- Available Points: 12,201

TIPS AND TRICKS
A simple range is 500 to 2000 points for each question you wish to answer based on your level of confidence. Be sure to not run out of points.

ANOTHER TIP

Networth Leaders

| | USERNAME | NETWORTH |
|---|---|---|
| 1 | Winner | 56,672 points |
| 2 | bwilson | 14,701 points |

ROI Leaders

| | USERNAME | ROI |
|---|---|---|
| 1 | celliesthep | 3.44% |
| 2 | garylebi | 2.46% |

SYSTEMS AND METHODS FOR USING A GRAPHICAL USER INTERFACE TO PREDICT MARKET SUCCESS

CROSS-REFERENCE TO RELATED APPLICATIONS

This application is related to and claims priority from the following US patent applications: it is a continuation-in-part of U.S. patent application Ser. No. 14/142,327, filed Dec. 27, 2013 for "Market Research Interface for Use with Prediction Market," which claims the benefit of U.S. Provisional Patent Application Ser. No. 61/746,825 filed Dec. 28, 2012 for "Market Research Interface for Use with Prediction Market," each of which is incorporated herein by reference in its entirety.

BACKGROUND OF THE INVENTION

1. Field of the Invention

The present invention relates generally to market research, and more particularly, to market research surveys and automated prediction markets.

2. Description of the Prior Art

Generally, it is known in the prior art to provide market research surveys through automated web sites having graphic user interfaces allowing users to make selections and/or indications of preferences and opinions, and to respond to questions. However, the use of prediction markets combined with market research surveys is less established. A prediction market is a speculative market whose purpose is to predict a likely outcome based on the so-called "wisdom of crowds." In many prediction markets, shares are sold that represent the likelihood of an event occurring or the likelihood of a particular level of success of a product or happening. Given enough participants, the information available to any single individual is combined with information from others to determine a possible result. Examples of such prediction markets include the Hollywood Stock Exchange, line-based gaming (e.g., sports betting), HedgeStreet, and others. A disadvantage of current prediction markets is the difficulty of learning the method of participating in the prediction market. Many people do not fully understand the notions of shares, trading, puts, calls, options, and the like, so are either disinclined to participate, or participate in a non-optimal way. The use of a stock market metaphor adds complexity to a prediction market that limits its usefulness, in particular, its application to market research surveys.

A market research survey is a method for research service to gather information related to a subject, typically a product or service. The survey may select participants who are asked specific questions about a product or service, and the responses are used to formulate predictions of likely success or response to the product or service in the marketplace. This is often done in the development stage of new products or services to gauge consumer reaction to the products in advance of commercial sales or even finalization of the design of a product. A disadvantage of market research surveys is that they are expensive and time-consuming to recruit or gather participants for the survey. In addition, the data acquired must be analyzed for some time to determine what the responses may mean. Furthermore, a large number of participants is needed to obtain an adequate sample size or sample points to generate meaningful data or statistically significant results. Also, many market research surveys only request a participant to rank products in an order of preference; this ranking information does not provide useful information about the products, and may not represent the true likelihood of market success of the products.

Examples of prior art reference documents include the following:
U.S. Pat. No. 8,612,331;
U.S. Pat. No. 8,285,632;
US Patent Application Publication No. 20100125520;
US Patent Application Publication No. 20130035981.

Thus, there remains a longstanding, unmet need in the prior art to provide automated market research surveys combined with prediction markets in a way that does not confuse users or market research survey participants or add complexity that confounds the goals of the research.

SUMMARY OF THE INVENTION

The present invention relates to market research surveys and automated prediction markets. The present invention provides systems and methods having a graphic user interface for market research surveys that allows users to participate in a combined prediction market and market research environment virtually without being presented directly with a stock market environment. The systems and methods of the present invention use prediction markets to automatically transform the user-provided inputs and/or selections from market research surveys, and automatically generate data that represents the likelihood of success of a product and/or service in the marketplace or commercial markets.

It is an object of this invention to provide methods for providing market research surveys includes the steps of: providing an interactive graphic user interface (GUI) on a website that is accessible by a multiplicity of remote user computing devices via a communications network, a remote server computer and database constructed and configured with a prediction market software operable thereon, wherein the GUI is operable to perform the following steps: presenting at least two questions to a multiplicity of virtual market participants on the corresponding multiplicity of remote user computing devices; presenting a plurality of answers for each of the corresponding at least two questions; restricting the inputs and/or selections receivable via the GUI to allow only one answer input and/or selection for each question; the remote server computer automatically transforming the inputs and/or selections received, using the prediction market software, into a combined outcome; wherein the combined outcome is used as at least one securities element in a virtual market, for indicting a likelihood of success associated with at least one product or service.

Yet another object of this invention is to provide systems for providing market research surveys using analytics automatically generated using predictive market models is provided including the following: an interactive graphic user interface (GUI) on a website that is accessible by a multiplicity of remote user computing devices via a communications network, a remote server computer and database constructed and configured with a prediction market software operable thereon, wherein the GUI is operable to perform the following steps: at least two questions presented via the GUI to a multiplicity of virtual market participants on the corresponding multiplicity of remote user computing devices; a plurality of answers for each of the corresponding at least two questions presented via the GUI; wherein the inputs and/or selections receivable via the GUI are restricted to allow only one answer input and/or selection for each question; and wherein the remote server computer automatically transforms the inputs and/or selections received, using the prediction market software, into a combined outcome; wherein the combined outcome is used as at least one securities element or stock in a virtual market that is not visible to the market survey participant or user of the GUI, for automatically indicting a likelihood of success associated with at least one product or service.

A further object of this invention is to provide a graphic user interface (GUI) for virtual market maker participation by a multiplicity of users including: an interactive market research GUI operatively associated with a website hosted on a server computer for remote access by a multiplicity of users for completing at least one market research survey; the GUI further including at least two questions presented visually and/or audibly via the GUI to a multiplicity of virtual market participants; a plurality of answers for each of the corresponding at least two questions presented visually and/or audibly by the GUI; and wherein the inputs and/or selections receivable via the GUI are restricted to allow only one answer input and/or selection for each question, and wherein the answers are non-binary.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2 is another graphic user interface screen shot view according to an embodiment of the invention.

FIG. 5 is another graphic user interface screen shot view according to an embodiment of the invention.

FIG. 7 is another graphic user interface screen shot view according to an embodiment of the invention.

FIG. 8 is another graphic user interface screen shot view according to an embodiment of the invention.

DETAILED DESCRIPTION

Figure 1:
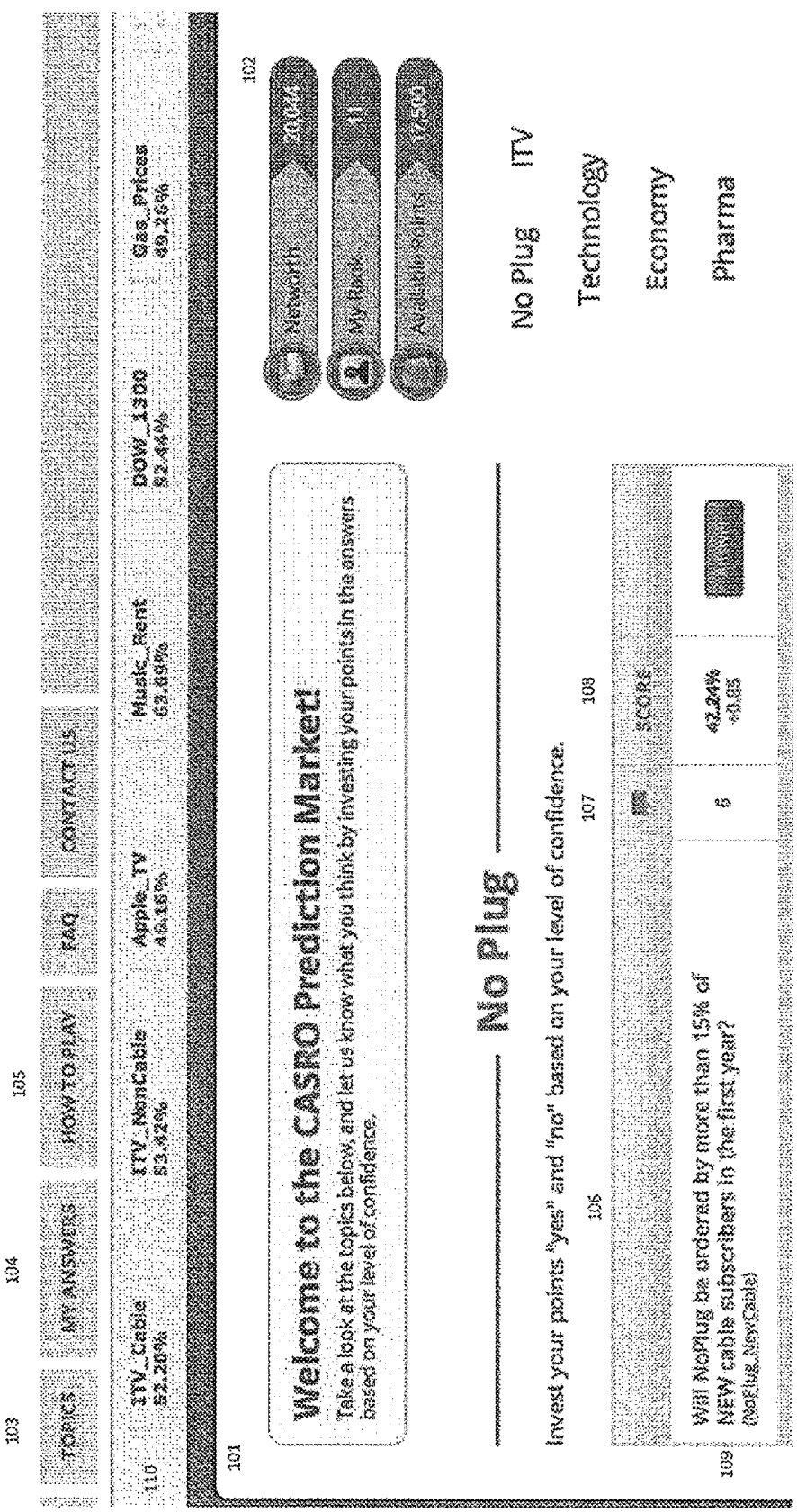
FIG. 1 is a graphic user interface screen shot view according to an embodiment of the invention.

Referring now to the drawings in general, the illustrations are for the purpose of describing a preferred embodiment of the invention and are not intended to limit the invention thereto.

The present invention provides systems and methods having a graphic user interface for market research surveys that allow users to participate in a combined prediction market and market research environment virtually without being presented directly with a stock market environment. The present invention also provides a market research interface to an automated market research survey tool that uses prediction market techniques, algorithms, and/or software designed, constructed and configured to operate on a server computer, and more preferably in a cloud-based system accessible via a network, such as the Internet, and having a graphic user interface presented via a website. The systems and methods of the present invention provide a novel, easy-to-use market survey type interface that removes or eliminates the disadvantages of current prediction market interfaces: simple questions are presented to users via a graphic user interface (GUI) on a computer, and the answers provided by the users drive an underlying prediction market operation or analytics, which the user does not need to be aware of, much less understand, in order to allow the user to participate in the surveys for market research. In addition, the systems and methods of the present invention automatically generate data that provide more accurate market research data and results with far fewer participants than required by traditional market research known in the prior art, and much more quickly and economically/cheaply than with traditional market research known in the prior art. The systems and methods of the present invention use prediction markets to automatically transform the user-provided inputs and/or selections from market research surveys, and automatically generate data that represents the likelihood of success of a product and/or service in the marketplace or commercial markets. Preferably, the market research graphic user interface (MRGUI or GUI) is dynamic and provides for interactivity by users, and the MRGUI is presented to users via a virtualized computing system wherein the users may exist at distributed locations.

Because the systems and methods of the present invention are easier to use than traditional prediction markets, a smaller number of participants or users provides more accurate and reliable information than traditional models because there is less erroneous input. Additionally, the systems and methods of the present invention allow participants to self-select questions for which they already have an interest, leading to improved and more useful results from a market research perspective. In one embodiment of the present invention, an improved market research survey interface is provided with a stock market prediction style algorithms or software on the back end that are not visible or viewable by the participants or users who are providing the inputs and/or selections for the market research survey questions and/or prompts. Thus, the present invention systems and methods provide the advantages of consumer survey, prediction markets, and custom consumer panels to provide high quality, reliable data that is automatically transformed by the systems and methods of the present invention to results data that indicate the success of the product and/or service in the marketplace or commercial market.

According to embodiments of the present invention, a method for providing market research surveys includes the steps of: providing an interactive graphic user interface (GUI) on a website that is accessible by a multiplicity of remote user computing devices via a communications network, a remote server computer and database constructed and configured with a prediction market software operable thereon, wherein the GUI is operable to perform the following steps: presenting at least two questions to a multiplicity of virtual market participants on the corresponding multiplicity of remote user computing devices; presenting a plurality of answers for each of the corresponding at least two questions; restricting the inputs and/or selections receivable via the GUI to allow only one answer input and/or selection for each question; the remote server computer automatically transforming the inputs and/or selections received, using the prediction market software, into a combined outcome; wherein the combined outcome is used as at least one securities element in a virtual market, for indicting a likelihood of success associated with at least one product or service.

Preferably, the method steps further include the step of indicating a winning outcome, wherein the winning outcome has the greatest likelihood of predictive accuracy.

Also, in preferred embodiments, at least some of the questions do not have binary answers. It may be preferably in some cases to provide that no questions have binary answers. Also, in preferred embodiments, for improving accuracy of outcomes and results from the predictive markets using fewer participants in the virtual marketplace, the answer input and/or selection for each question is non-binary.

Also, an additional step is provided for the server computer to automatically transform the answers into at least two visual representations, including at least one legend indicating components of each visual representation(s). Furthermore, the server computer may function for automatically modifying the questions based upon combined outcomes generated by the server computer. The method may further include the step of automatically modifying the questions based upon combined outcomes generated by the server computer, and based upon a distribution of answers over the multiplicity of virtual market participants; another method step may include the step of automatically generating the combined outcome for individual virtual market participants and/or for aggregated total virtual market participants.

In other embodiments of the present invention, a system for providing market research surveys using analytics automatically generated using predictive market models is provided including the following: an interactive graphic user interface (GUI) on a website that is accessible by a multiplicity of remote user computing devices via a communications network, a remote server computer and database constructed and configured with a prediction market software operable thereon, wherein the GUI is operable to perform the following steps: at least two questions presented via the GUI to a multiplicity of virtual market participants on the corresponding multiplicity of remote user computing devices; a plurality of answers for each of the corresponding at least two questions presented via the GUI; wherein the inputs and/or selections receivable via the GUI are restricted to allow only one answer input and/or selection for each question; and wherein the remote server computer automatically transforms the inputs and/or selections received, using the prediction market software, into a combined outcome; wherein the combined outcome is used as at least one securities element in a virtual market, for automatically indicting a likelihood of success associated with at least one product or service. As with the method steps, preferably, the system provides for a winning outcome generated automatically by the server computer, wherein the winning outcome has the greatest likelihood of predictive accuracy.

Also, for improved accuracy for predictive outcomes from the systems of the present invention, the system is provided wherein the questions do not have binary answers and/or wherein the answer input and/or selection for each question is non-binary.

Also preferably, the server computer automatically transforms the answers into at least two visual representations, including at least one legend indicating components of each visual representation(s). The server computer is preferably operable with predictive market software that has artificial intelligence to enhance the market survey dynamically, based upon the inputs and/or selections received via the MRGUI. By way of example, the server computer automatically modifies the questions based upon the combined outcomes that are generated by the server computer and/or the server computer automatically modifies the questions based upon combined outcomes generated by the server computer and based upon a distribution of answers over the multiplicity of virtual market participants.

In preferred embodiments, the server computer automatically generates the combined outcome for individual virtual market participants and/or for aggregated total virtual market participants to provide different perspectives from the market research survey.

Additionally, the present invention provides graphic user interface (GUI) for virtual market maker participation by a multiplicity of users including: an interactive market research GUI operatively associated with a website hosted on a server computer for remote access by a multiplicity of users for completing at least one market research survey; the GUI further including at least two questions presented visually and/or audibly via the GUI to a multiplicity of virtual market participants; a plurality of answers for each of the corresponding at least two questions presented visually and/or audibly by the GUI; and wherein the inputs and/or selections receivable via the GUI are restricted to allow only one answer input and/or selection for each question, and wherein the answers are non-binary. Preferably, to simplify the market research survey via the GUI, for the answers indicated on the GUI, each answer is provided with a corresponding at least one visual representation, including at least one legend indicating components of the visual representation(s).

Regarding prediction markets used in combination with the market research survey systems and methods of the present invention, while a number of approaches to conducting prediction markets are known in the prior art, the systems and methods of the present invention prefer the approach similar to those taught and described in U.S. Pat. No. 8,612,331, which is incorporated herein by reference in its entirety.

Referring now to the figures, FIG. 1 shows a graphic user interface screen shot view according to an embodiment of the invention; more specifically, it illustrates a topic selection interface. FIG. 1 illustrates an embodiment of a market research style interface of the system and GUI. The interface or GUI 101 provides a number of regions that help inform and guide a user or virtual market participant to provide inputs and/or selections that create data that is used in an underlying or back end prediction market algorithm(s) and/or software operable on a server computer to provide useful market research results and information. The GUI includes a region 102 that shows statistical information for the user, including but not limited to net worth based on a number of "points" that the user has associated with his/her user profile, a user rank compared with other users, and the available points of the user for that interaction, and/or overall. The available points may be less than the net worth of the user if some of the points have already been committed to answers on topics or items that have not yet "closed" or completely concluded. The closing of an item or topic is determined by the company or entity that creates or poses the questions or topics for market research virtually via the server computer and GUI. The questions are provided to the server computer and associated with a company profile generated for and/or associated with the market research survey presented via the GUI. The questions usually have an associated time limit (e.g., number of days or other predetermined period of time) in which the company expects to receive enough data to provide a useful result, i.e., to receive outcomes that are statistically relevant and/or accurate for predictive value based upon a predetermined or minimum number of users providing inputs and/or selections for answers for questions. In some cases, the constraint on the question or topic may be time-based, or it may be based on a threshold number of users answering one or more questions (volume-based), or a combination of time-based and volume-based. The GUI illustrated in FIG. 1 further includes a number of tabs allowing the user to select actions and activities. The Topics tab 103, shown as active in the example of FIG. 1, presents a number of topics such as topic 109 to the user. The user is free to select or indicate any topic and to answer any number of the questions associated with a chosen topic, based upon the user's interest and confidence in the user's answer, i.e., in preferred embodiments, the GUI does not require that all questions are answered by each user to complete the market research survey. This important feature and functionality of the present invention systems, methods, and GUI increases the self-selecting nature of the participants in the system, which allows a group of users in the system to be self-selected automatically. This contrasts significantly with prior art market research, wherein consumer marketing firms typically select the market research survey users or participants from their own contacts and/or efforts to identify qualified users for each survey, based upon the requirements, type of questions, etc. that are provided by the company.

FIG. 1 also illustrates the GUI providing selection options for the user including My Answers 104, How to Play 105, and other tabs as required. For each topic, a summary question 106 of the topic is provided, along with the current number of users 107 answering the question and the score 108 of the question. The score represents the overall likelihood of a Yes answer to the question, which is positive. In this example, the score of 42.24 means that there is a corresponding 42.24 percent likelihood that the product will be successful based upon that question. The score is provided on a scale of 0-100 in a preferred embodiment of the present invention. The score for each question may be considered individually, or aggregated over all questions associated with a predetermined product or service to generate an aggregated result across questions and across users. In one embodiment, the system may provide a visual representation of the score shown by a green (rising) or red (falling) indicator, and/or a green or red number below the score to show the amount of change over some period of time (for example but not as a limitation, within one day). FIG. 1 further includes a GUI having a "ticker" 110 that shows the value of other topics. This ticker may be limited to displaying only those items in which a user has a position; alternatively, it may include all open items in the system, or items with recent updates. When a user selects a topic and click selects "Answer" in the interface of FIG. 1, the GUI automatically presents the user with another GUI illustrated in FIG. 2. In one embodiment of the system, this second GUI or interface is used to provide additional information about the topic so that the user can make a more informed answer to the topic question or concept.

Figure 3:
FIG. 3 is another graphic user interface screen shot view according to an embodiment of the invention.

FIG. 2 shows another graphic user interface screen shot view on a display associated with a computer device usable by a user or virtual market participant according to an embodiment of the invention; more specifically, it illustrates a topic selection interface. The topic Question 201 defines the topic in the GUI. The question 201 may include a picture of the product and/or service, and a description 203 that provides additional information. Region 202 is a comments section where the user can see comments about the topic from other users and even post a comment themselves. The GUI presents the user with a simple choice of Yes 204 or No 205 below the question 201 and description 205. If the user chooses to answer the question, then the server computer receives the Yes response and automatically presents the user with another GUI or interface screen, which is illustrated by FIG. 3. Optionally, this GUI may be viewable when the presentation of the choice or question and answer about continuing to answer the question, and/or when the topic selection is indicated by the user via the GUI and received by the remote server computer. The interface indicates a region 301 in which the GUI presents the user with a confidence indicator, wherein inputs may be received from the user via the GUI in a numerical format, e.g., percent confidence, level of confidence on a scale of 0-100 or another scale, etc. and/or in an interactive visual indication, such as with a slider mechanism wherein moving from a first position to a second position in any direction indicates more or less confidence, e.g., positive to negative, or on a scale, etc. The confidence may be further indicated using the number of points for that user that the user wishes to play or to bid on the topic; on the back end, which is not visible to the user via the GUI, the confidence using the number of points correlates to predictive market applications for the analytics by the server. A higher number of points corresponds to higher confidence by the user. This is referred to as a Confidence Field, wherein the GUI receives information or inputs by the user indicating the user's confidence in the user's answer by allocating or "betting" points on the outcome, i.e., that the overall outcome for that question will be the same as the user's inputs. If the user is very confident in the answer, then more points will be indicated, or at risk of loss. If at the end of a predetermined period of the presentation of the topic on the GUI by the system, more payout points may be awarded to that user's profile or points total based upon the user's confidence, wherein the payout points are automatically determined by the remote server computer based upon the prediction market software operating thereon. A strongly confident "No" 205 answer is automatically transformed by the server computer and the predictive market back end into a short sell of stock, inasmuch as the user is predicting that the topic will not be successful and the score will drop or decrease. A strongly confident "Yes" 204 answer is a prediction that the score will rise or increase. The relative strength of the "Yes" or "No" answer or input by the user is based upon the Confidence inputs and/or indications by the user (i.e., higher points allocated and/or "bet" indicates a stronger confidence than less points) and/or are directly selectively noted in the GUI as "strong Yes" or "strong No". Once the user has provided the Confidence number 301 or input, the user can then select Submit 302 on the GUI to enter the answer into the system.

FIG. 3 shows another graphic user interface screen shot view according to an embodiment of the invention; more specifically, it illustrates an interface for answering a question and entering a confidence amount. The amount of confidence points that are entered by the user in connection with the answer represents a "purchase" of units of that topic, based upon the current confidence score. For example, as set forth earlier, a confidence score of 42.24 was provided. If the user entered 2500 confidence points in the Yes answer, the user would automatically receive a predetermined number of units, e.g., 35.5 units, for "spend" or "bet" on that topic applied to the user profile. If the user's answer correctly predicts the outcome automatically generated by the system based upon all answers received and considered, then the system automatically allocates additional points, e.g., 100 points, for each unit owned, or in this case, 3550 points. In some cases, the question is such that a binary answer is not provided or allowed, or that the question is restricted to have answers receivable only as non-binary answers. Also, in some cases, the question is such that a Yes or No answer will not be known for some time, perhaps indefinitely. In those cases, the system defines a close-out time or completion time for the topic or question, and payoffs are made or allocated to users based upon the confidence score at the time of closing. For example, if a user purchased at a confidence score of 60 and the topic or question closed at 70, the user is allocated 10 points per share. Similarly, a lower confidence score represents a loss of points. Although this example is explained with the term "shares" the user is not necessarily made aware of the shares algorithms associated with the stock market prediction market model, i.e., the user is not aware of the share transactions that occur automatically by the server computer for the virtual market based upon the answers received from the GUI user inputs or answers. To the user, a survey type interface is presented in a novel and unique way that provides meaningful data to the underlying prediction market algorithm(s) that transform the user input data to provide useful market research results automatically.

In one embodiment of the present invention, the system presents a query to the user via the GUI "Tell us why you answered in this manner". This provides additional market research data in addition to the prediction market type information automatically generated by the system and remote server computer. An advantage of the systems and methods of the present invention is the combination market research survey and prediction market that is presented through the GUI to the user in such a manner to eliminate complexity and confusion for the user by masking the prediction market on the back end, i.e., the GUI appears to be traditional market research, although the inputs and selections of the users entered via the GUI are transformed by the prediction market back end operable on the server, so that the user does not have awareness of the back end operations. Thus, the company generating the topic can simply generate questions that are simple and useful in eliciting answers by users via the GUI, and self-selecting users respond to the topic questions because they have self-identified via user profiles matching the topic and/or by themselves selecting the topic and/or questions to answer based upon interest, not based upon required answers to be provided or inputted for every question on a survey, as with prior art. This is a significant advantage of the present invention.

Figure 4:
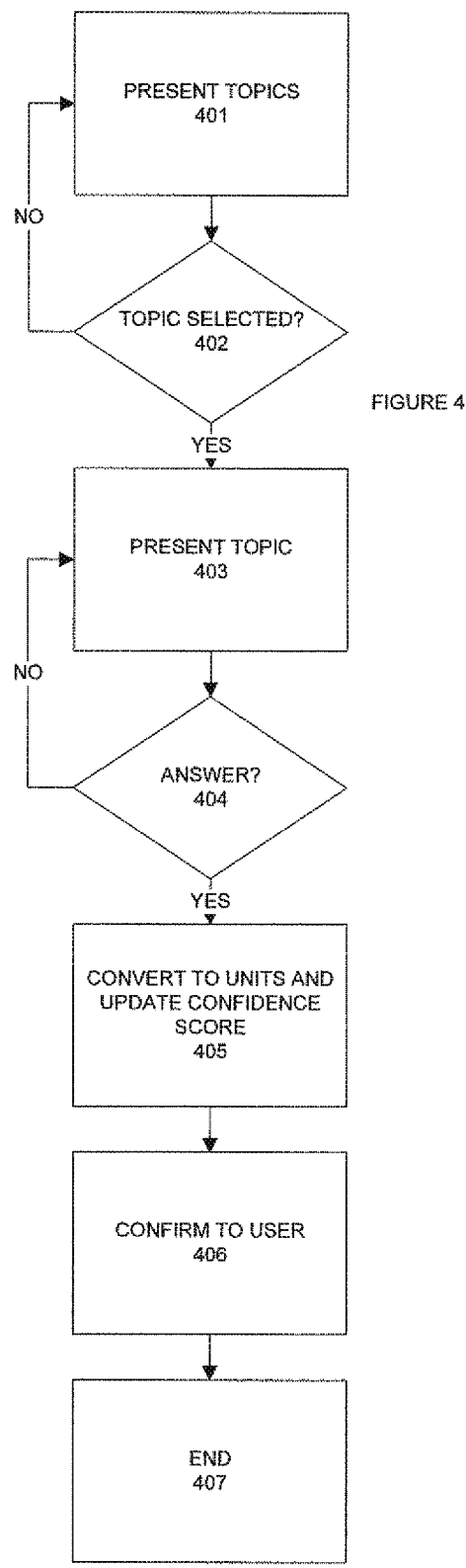
FIG. 4 is a flow diagram illustrating method steps used with an embodiment of the invention.

FIG. 4 shows a flow diagram illustrating method steps used with an embodiment of the invention. At step 401 the user is presented with a plurality of topics as indicated in FIG. 1. At decision block 402 it is determined if the user has selected a topic. If not, the system returns to step 401. If yes, then the system proceeds to step 403 and automatically presents the selected topic as with FIG. 2. At step 404 the system determines if the user has provided inputs and/or selections for answers, and provided a confidence level corresponding thereto. If not, the system returns to step 403. If so, the system automatically translates the user's answer into share units and updates the score for the topic and the user account or user profile at step 405. Step 406 provides the system automatically confirming the answer and confidence score to the user, and ends at step 407. The use of combined prediction market and market research survey system with a market research style GUI or interface provides unique information that would otherwise not be available with prior art. The method of reporting results to the user and/or to the company providing the questions to be answered is also unique to the present invention.

FIG. 5 is another graphic user interface screen shot view according to an embodiment of the invention; more specifically, it illustrates a spread analysis interface for a topic and set of questions. At region 501 the user selects which topics to answer. Region 502 shows all questions associated with the topic. Region 503 shows the spread analysis for each question. This shows the points that have been invested in each question, and the passion and intensity of responses, including the confidence level indication by the users (illustrated on the x-axis). For example, the question related to whether current TV owners would switch to the project had very little activity as shown by bar 505. By contrast, bar 504 shows that this question had the most investment and it was all positive. The bar 506 shows there was significant activity but the majority of it was negative. The reporting provided by the systems and methods of the present invention show overall preferences to a particular question based upon aggregation of all user inputs along with confidence scores, so that merely the number of participants that prefer an outcome is not necessarily dispositive of the answer, i.e., the combination of the answer and the confidence level is transformed by the system to generate the outcome, rather than simply considering the number of answers. In other words, the answers are weighted by their confidence scores and these weighted answers are used to give an aggregate answer. This is particularly valuable and importantly associated with non-binary answers to the questions.

Figure 6:
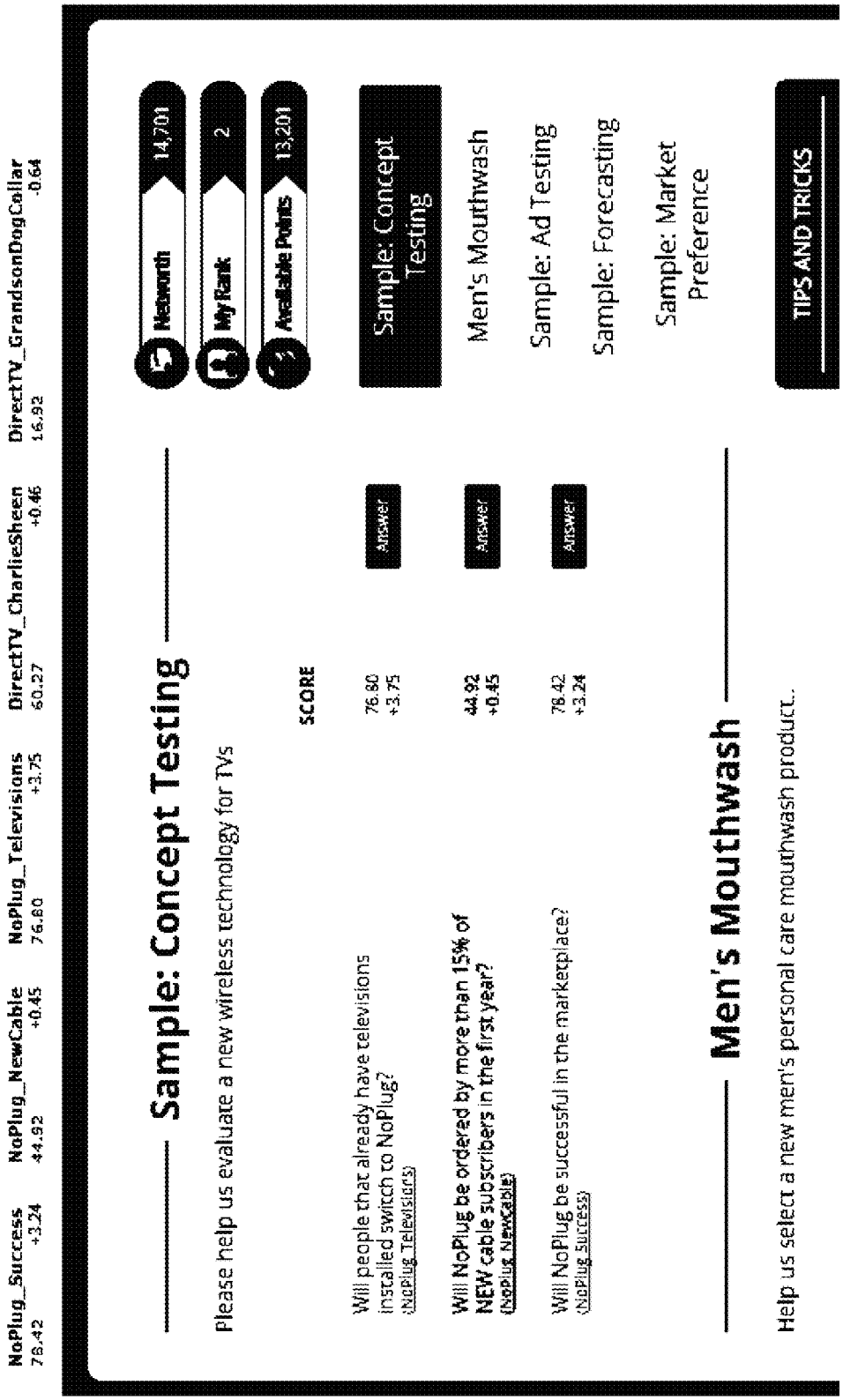
FIG. 6 is another graphic user interface screen shot view according to an embodiment of the invention.

FIG. 6 shows another embodiment of the GUI for selecting questions.

FIG. 7 shows another embodiment of the GUI for answering a question and submitting comments.

FIG. 8 shows another embodiment of the GUI for tracking answers and performance.

Figure 9:
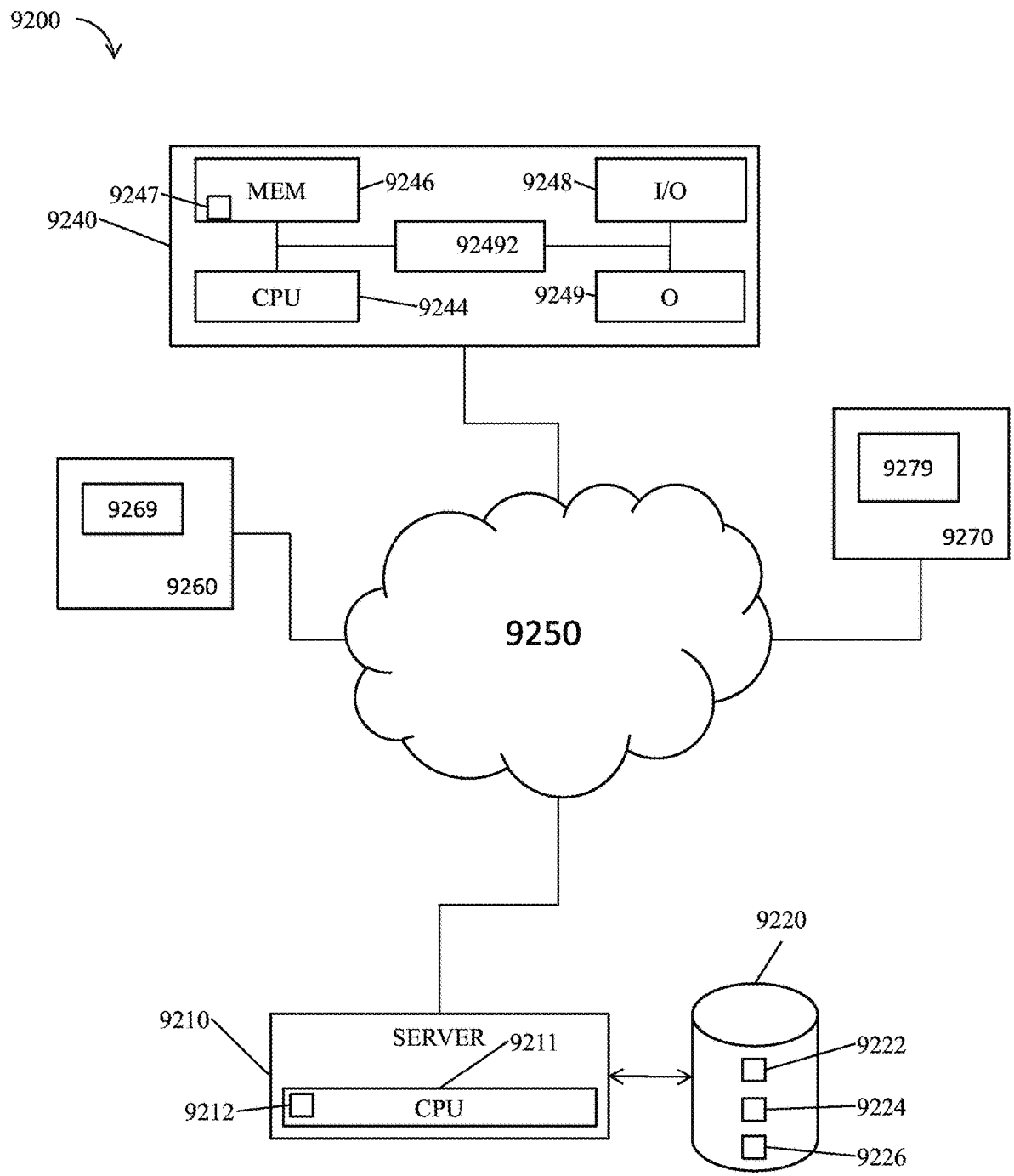
FIG. 9 is a schematic diagram illustrating a virtualized computer system used with embodiments of the present invention.

FIG. 9 shows a schematic diagram illustrating a virtualized computing system used with embodiments of the present invention; FIG. 9 illustrates components of a virtualized or cloud-based computing system and network for distributed communication therewith by mobile communication devices. As illustrated in FIG. 9, a basic schematic of some of the key components of a virtualized computing (or cloud-based) system according to the present invention are shown. The system 9200 comprises a server computer 9210 with a processing unit 9211. The server 9210 is constructed, configured and coupled to enable communication over a network 9250. The server provides for user interconnection with the server over the network using a remote computer device or a personal computer (PC) or smartphone, tablet computer, etc. 9240 positioned remotely from the server. Furthermore, the system is operable for a multiplicity of remote personal computers or terminals 9260, 9270 for example, in a client/server architecture, as shown. Alternatively, a user may interconnect through the network 9250 using a user device such as a personal digital assistant (PDA), mobile communication device, such as by way of example and not limitation, a mobile phone, a cell phone, smart phone, tablet computer, laptop computer, netbook, a terminal, or any other computing device suitable for network connection. Also, alternative architectures may be used instead of the client/server architecture. For example, a computer communications network, or other suitable architecture may be used. The network 9250 may be the Internet, an intranet, or any other network suitable for searching, obtaining, and/or using information and/or communications.

The system of the present invention further includes an operating system 9212 installed and running on the server 9210, enabling server 9210 to communicate through network 9250 with the remote, distributed user devices. The operating system may be any operating system known in the art that is suitable for network communication.

The terms "question" and "stock" are used interchangeably in the present invention. Thus, the present invention provides for a prediction market system, including a computer system including a server computer and at least one database in electronic, digital communication over a network, connectable or accessible remotely through the network by at least one other remote computing device, the server running a software providing an automated market maker; a liquidity management system (LMS) with administrative controls for the market maker for sensitivity, quantity, fulcrum and window in order to provide enough liquidity so that about all answers receive investment by investors who are potentially informed enough to make an investment, but not so much that investors can invest beyond their informed ability; an investment transaction interface, wherein the investment transaction interface includes an interactive slider interface with a slider control that allows one-step user selection to choose the amount of money to manage and wherein the automated market maker automatically calculates and displays in the investment transaction interface the amount of stock the user is to receive or sell; thereby providing a prediction market system that is intuitive and gives good predictions.

The automated market maker creates liquidity in the system by providing ongoing buy and sell orders that are logarithmically spaced in a price ladder. The automated market maker also provides for double auction by incorporating limit orders. The administrative controls are preferably set as follows: The sensitivity is about 20; the quantity is about 100; the fulcrum is about 50.00 and the window is about 30. Notably, these administrative control settings provide for optimal market participation such that an answer receives investment by investors who are potentially informed enough to make an investment, but not so much that investors can invest beyond their informed ability.

The investment transaction interface permits buying and selling shares with the same slider in a single action. The payout is binary or variable. The stocks are grouped and/or linked. The system advantageously helps investors to make bets by providing a more interactive interface that provides immediate information regarding investing in an answer or stock. The present invention does this by providing a slider interface that helps users understand the complex interactions of making investment in this market.

In many traditional prior art prediction market applications, when a user wants to make a trade, they are presented with an interface that requires them to enter a specific number of shares they want to buy or sell in that transaction. The system then determines how much that trade will cost, and supplies this information to the participant. Unfortunately, this process can be somewhat cumbersome and even confusing to users, especially novices.

By contrast to prior art and traditional prediction markets, and as an alternative, the present invention platform provides an intuitive slider GUI interface that automatically varies the amount of money that will be transacted with inputs received via the single action slider GUI interaction by the user. When a decision to trade has been made and the 'Trade' button is selected, the trading interface automatically overlays the screen, rather than redirecting to a different web page for immediate inputs by the platform. By default, the slider bar is positioned at the market consensus when it loads. This position is important because it is a visual representation of the current consensus between two extremes, two prices, or two answers. In contrast to the prior art, the user is able to understand the current consensus relative to all possibilities. For a trade input, the platform is operable to detect a movement of the slider bar across the spectrum and the corresponding direction and distance of the movement following the movement in the form of user single action. The movement and corresponding direction and distance of the movement are automatically processed in real-time. The platform dynamically determines a value for each end of the spectrum based on an amount of money or points that a particular user is able to use in a transaction. Once movement of the slider bar is detected, the platform automatically displays the cost of the trade or answer based upon the position of the slider. Preferably, the platform displays the cost of the trade or answer in a table of the GUI. The table is updated instantly by the platform upon detection of movement of the slider bar, with the updates being based on the direction and distance of the movement. The table of the GUI includes a summary of holdings, including the current holdings, the cost of the trade or answer in points or cash, and the resultant holdings after the trade or answer. The table of the GUI also includes current cash or points, the cost of the trade or answer in cash or points, and the resultant cash or points after the trade or answer. Advantageously, the table also includes a maximum payout based upon the cash or points allocated to the trade or answer. The maximum payout allows a user to make an informed choice about allocating an amount of cash or points to a transaction or answer.

The slider interface is also operable in actual market transactions. An investment transaction interface for trading actual shares in a stock and commodities exchange includes a slider for choosing the amount of money to invest or divest. The interface calculates the amount of stock the user is to receive or sell. This interface permits buying and selling shares with the same slider in a single action. Furthermore, the interface permits the buying and selling of shares and/or options with the same slider in a single action. In these embodiments, the limits are the available money in the user's account and/or the stock or options the user has available to sell. The prices are the actual prices that other buyers and sellers of the stock have chosen.

Notably, the claimed invention is necessarily rooted in computer technology and inextricably tied to computer technology because, inter alia, the claimed invention addresses improving the functioning of a GUI by using an interactive slider interface. Like the invention at issue in DDR Holdings, the claimed invention does not merely recite a prediction market system known from the pre-Internet world along with the requirement to perform it on a computer or on the Internet. The interactive slider interface with the slider control that allows for one-step user selection to choose the one answer input and/or selection and a confidence rating the user is to input for the one answer input and/or selection, wherein the slider control permits inputting a positive confidence rating or a negative confidence rating in the interactive slider interface with the same slider in a single action is essential to the functionality of the claimed invention and is at the heart of the claimed invention. Notably, it is not possible to perform the claimed system manually or by hand. In other words, the systems and methods of the present invention are not merely taking a concept known from the pre-Internet world or the pre-computer world with the requirement to perform the transactions over the Internet or over a computer network. Rather, these transactions require technology specific to the Internet or computer networks, and could not be performed in a pre-Internet or pre-computer technology world.

In one embodiment of the present invention, looking up the score associated with a product or service or a question relating to a product or service, updating the score associated with a product or service or a question relating to a product or service, looking up and/or updating a user profile and/or a user rank, and/or updating the available user points is performed in real-time using self-referential score tables. In another embodiment, looking up the score associated with a product or service or a question relating to a product or service, updating the score associated with a product or service or a question relating to a product or service, looking up and/or updating a user profile and/or a user rank, and/or updating the available user points is performed via a data storage and retrieval system for a computer memory over a network in real-time, wherein the system uses a logical table including a plurality of logical rows and plurality of logical columns to look up, store, and present real-time data. The plurality of logical columns intersects the plurality of logical rows to define a plurality of logical cells. Each logical row corresponds to a record of information, preferably a score or components of a score. Alternatively, each logical column corresponds to a record of information, preferably a score or components of a score. In one embodiment, the logical column or logical row includes one or more formulas for determining any of the aforementioned scores. Object identification numbers (OID) are used in one embodiment to identify each logical row and/or each logical column.

In one embodiment, the system maintains a database including score tables relating to the questions (or price/value tables for stock market embodiments) and other computer-based storage schemes for data storage. The score tables and other computer-based storage schemes utilize a logical table including a plurality of logical rows and plurality of logical columns to look up, store, and present real-time data in one embodiment. The remote server computer is operable to add, modify and delete score tables in the logical table format, the logical table format including a plurality of logical rows and plurality of logical columns to look up, store, and present real-time data whenever new score data is received over the network.

In one embodiment, looking up the score associated with a product or service or a question relating to a product or service, updating the score associated with a product or service or a question relating to a product or service, looking up and/or updating a user profile and/or a user rank, and/or updating the available user points is performed via a data storage and retrieval system for a computer memory, including means for configuring said memory according to a logical table, said logical table including: a plurality of logical rows, each said logical row including an object identification number (OID) to identify each said logical row, each said logical row corresponding to a record of information, a plurality of logical columns intersecting said plurality of logical rows to define a plurality of logical cells, each said logical column including an OID to identify each said logical column, and means for indexing data stored in said table.

Means for configuring the memory include, but are not limited to, creating in a computer memory, a logical table that need not be stored contiguously in the computer memory, the logical table being comprised of rows and columns, the rows corresponding to records, the columns corresponding to fields or attributes, the logical table being capable of storing different kinds of records; assigning each row and column an object identification number (OID) that, when stored as data, acts as a pointer to the associated row or column and that is operable to be of variable length between databases; and for each column, storing information about that column in one or more rows, rendering the table self-referential, the appending, to the logical table, of new columns that are available for immediate use being possible through the creation of new column definition records; and in one or more cells defined by the intersection of the rows and columns, storing and accessing data, which includes structured data, unstructured data, or a pointer to another row.

Means for indexing includes, but is not limited to, extracting key numbers or percentages from the applicable cells in the logical table; storing the extracted key numbers or percentages in an index, which is itself stored in the logical table; including, in cells of the logical table, pointers to the corresponding entries in the index, and including, in the index, pointers to the text cells.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for providing market research surveys by at least retrieving electronic data over a network in real-time and displaying the electronic data in a graphical user interface (GUI) comprising:

presenting at least two questions related to forecasting consumer behavior with respect to at least two products and/or services to a multiplicity of virtual market participants on an interactive GUI on a website that is accessible by a multiplicity of remote user computing devices corresponding to the multiplicity of virtual market participants via a communications network, a remote server computer and database constructed and configured with a prediction market software operable thereon, wherein the at least two questions are self-selected by the multiplicity of virtual market participants;

presenting, on the interactive GUI, a score for each of the at least two questions respectively representing an overall likelihood of a positive answer for the associated question;

presenting, on the interactive GUI, a trade button for each of the at least two questions;

upon selection of a trade button, presenting an interactive slider interface in the interactive GUI which overlays the existing content rather than redirecting to a different web page, the presented interactive slider interface including at least a plurality of answers including the positive answer and a negative answer for one of the at least two questions and a slider control that allows one-step user selection of one answer and a confidence rating for the one answer, wherein the slider control in the interactive slider interface restricts answer selections receivable to allow only one answer for each question and permits simultaneously inputting either a positive confidence rating or a negative confidence rating with the same slider in a single action;

receiving, by the remote server computer, a user selection of one answer and an associated confidence rating via the single action with the slider control of the interactive slider interface; and automatically, by the remote server computer, updating the score and determining a percent change in the score based at least in part on the received user selection of the one answer and associated confidence rating via the single action;

upon receiving the user selection of the one answer and associated confidence rating via the single action with the slider control of the interactive slider interface presenting an additional query in the interactive GUI relating to a reason for the selected one answer and confidence rating concurrently with an indication of the determined percent change in the score;

using, by the remote server computer, the updated score for indicating a likelihood of success associated with the at least two products and/or services.

2. The method of claim 1, further including the step of indicating on the interactive GUI, a winning outcome, wherein the one answer is compared against the winning outcome to adjust a rank for the user on the website.

3. The method of claim 2, wherein the winning outcome has the greatest likelihood of predictive accuracy corresponding to the at least two products and/or services.

4. The method of claim 1, further including the step of automatically generating a combined outcome for individual virtual market participants and for aggregated total virtual market participants, wherein the combined outcome is used as at least one securities element and/or stock such that the combined outcome is not visible via the interactive GUI to the individual virtual market participants and the aggregated total virtual market participants.

5. The method of claim 1, wherein presenting the score for each of the at least two questions includes looking up the score for each of the at least two questions using a logical table including a plurality of logical rows and a plurality of logical columns to look up, store, and present real-time data, wherein each logical column corresponds to a score or components of the score, wherein each logical row is associated with one of the at least two questions.

6. The method of claim 1, wherein automatically updating the score based at least in part on the received user selection of the one answer and associated confidence rating includes updating the score in a logical table including a plurality of logical rows and a plurality of logical columns to look up, store, and present real-time data, wherein each logical column corresponds to a score or components of the score, wherein each logical row is associated with one of the at least two questions.

7. The method of claim 1, further comprising providing a spread analysis for the at least two questions, wherein the spread analysis includes a percentage corresponding to a number of points invested in each of the at least two questions and a range of points associated with the positive confidence rating or the negative confidence rating received via the GUI.

8. The method of claim 1, further comprising, for each question of the at least two questions, paying the user an amount of points based on the positive confidence rating or the negative confidence rating after a close-out time or a completion time and based on an a confidence score for each question of the at least two questions at the close-out time or the completion time.

9. The method of claim 1, further comprising, prior to receiving the user selection of the one answer and associated confidence rating via the single action with the slider control of the interactive slider interface, presenting on the interactive GUI an indication of a maximum payout based upon a cash and/or point value allocated to the one answer input and/or selection.

10. A system for providing market research surveys by at least retrieving electronic data over a network in real-time and displaying the electronic data in a graphical user interface (GUI) comprising:

a database;

a server computer configured with a prediction market software operating thereon and in communication with the database and a multiplicity of remote user computing devices via a communications network, the server computer configured to, present at least two questions related to forecasting consumer behavior with respect to at least two products and/or services to a multiplicity of virtual market participants on an interactive GUI on a website that is accessible by the multiplicity of remote user computing devices via the communications network, wherein the at least two questions are self-selected by the multiplicity of virtual market participants, present, on the interactive GUI, a score for each of the at least two questions, respectively representing an overall likelihood of a positive answer for the associated question, present, on the interactive GUI, a trade button for each of the at least two questions, present, upon selection of a trade button, an interactive slider interface in the interactive GUI which overlays the existing content rather than redirecting to a different web page, the presented interactive slider interface including at least a plurality of answers including the positive answer and a negative answer for one of the at least two questions and a slider control that allows one-step user selection of one answer and a confidence rating for the one answer, wherein the slider control in the interactive slider interface restricts answer selections receivable to allow only one answer for each question and permits simultaneously inputting either a positive confidence rating or a negative confidence rating with the same slider in a single action, receive a user selection of one answer and an associated confidence rating via the single action with the slider control of the interactive slider interface, automatically update the score and determine a percent change in the score based at least in part on the received user selection of the one answer and associated confidence rating via the single action, upon receiving the user selection of the one answer and associated confidence rating via the single action with the slider control of the interactive slider interface, present an additional query in the interactive GUI relating to a reason for the selected one answer and confidence rating concurrently with an indication of the determined percent change in the score, and using the updated score for automatically indicating a likelihood of success associated with the at least two products and/or services.

11. The system of claim 10, wherein the server computer is further configured to automatically generate a winning outcome, wherein the one answer is compared against the winning outcome to adjust a rank for the user on the website.

12. The system of claim 11, wherein the winning outcome has the greatest likelihood of predictive accuracy corresponding to the at least two products and/or services.

13. The system of claim 10, wherein the at least two questions do not have binary answers.

14. The system of claim 10, wherein the server computer is further configured to automatically transform the plurality of answers into at least two visual representations and/or at least two audible representations, including at least one legend indicating components of each visual representation, and to automatically modify the at least two questions based upon combined outcomes generated by the server computer and/or a distribution of answers over the multiplicity of virtual market participants.

15. The system of claim 14, wherein the server computer is further configured to automatically generate the combined outcome for individual virtual market participants and for aggregated total virtual market participants, wherein the combined outcome is used as at least one securities element and/or stock such that the combined outcome is not visible via the interactive GUI to the individual virtual market participants and the aggregated total virtual market participants.

16. The system of claim 10, wherein the server computer is further configured to present the score on the interactive GUI for each of the at least two questions by looking up the score for each of the at least two questions using a logical table including a plurality of logical rows and a plurality of logical columns to look up, store, and present real-time data, wherein each logical column corresponds to a score or components of the score, wherein each logical row is associated with one of the at least two questions.

17. The system of claim 10, wherein the server computer automatically updates the score based at least in part on the received user selection of the one answer and associated confidence rating by updating the score in a logical table including a plurality of logical rows and a plurality of logical columns to look up, store, and present real-time data, wherein each logical column corresponds to a score or components of the score, wherein each logical row is associated with one of the at least two questions.

* * * * *